United States Patent
Bayersdorfer (12)

(10) Patent No.: US 6,450,678 B1
(45) Date of Patent: Sep. 17, 2002

(54) INTERIOR DECORATING ITEM AND USE OF AN OPTICAL WAVE GUIDE AS DECORATIVE THREAD ON SUCH INTERIOR DECORATING ITEMS

(75) Inventor: Bernhard Bayersdorfer, Baierbach (DE)

(73) Assignee: Lisa Draxlmaier GmbH, Vilsbiburg (DE)

( * ) Notice: Subject to any disclaimer, the term of this patent is extended or adjusted under 35 U.S.C. 154(b) by 0 days.

(21) Appl. No.: 09/458,069

(22) Filed: Dec. 10, 1999

Related U.S. Application Data

(63) Continuation of application No. PCT/EP98/03449, filed on Jun. 9, 1998.

(30) Foreign Application Priority Data

Jun. 10, 1997 (DE) ........................ 197 24 486

(51) Int. Cl.⁷ .................................. G02B 6/36
(52) U.S. Cl. .................. 362/581; 362/551; 362/488
(58) Field of Search .............................. 362/551, 553, 362/554, 556, 555, 559, 570, 566, 576, 581, 470, 471, 488, 483, 26, 131

(56) References Cited

U.S. PATENT DOCUMENTS

| | | | | |
|---|---|---|---|---|
| 2,561,756 A | * | 7/1951 | Shook | 362/551 |
| 4,234,907 A | | 11/1980 | Daniel | |
| 5,206,562 A | | 4/1993 | Matsuno | |
| 5,647,658 A | | 7/1997 | Ziadi | |
| 5,709,448 A | * | 1/1998 | Jennings et al. | 362/559 |
| 5,879,076 A | * | 3/1999 | Cross | 362/555 |
| 6,238,075 B1 | * | 5/2001 | Dealy, Jr. et al. | 362/551 |

FOREIGN PATENT DOCUMENTS

| | | |
|---|---|---|
| DE | 18 05 911 | 12/1959 |
| DE | 43 11 359 | 10/1993 |
| DE | 93 18 356 | 3/1994 |
| DE | 43 15 645 | 11/1994 |
| DE | 195 20 389 | 12/1996 |
| EP | 05 15 921 | 5/1992 |
| EP | 0 719 673 | 10/1995 |
| FR | 2 620 396 | 3/1989 |
| JP | 02 068307 | 3/1990 |
| WO | WO 97 18105 | 5/1997 |

* cited by examiner

Primary Examiner—Y. My Quach-Lee
(74) Attorney, Agent, or Firm—Sughrue Mion, PLLC

(57) ABSTRACT

An interior decorating item such as a seat for motor vehicles or aircraft, an instrument console, an inner cover for vehicle doors or the like comprises an optical wave guide (1) which emits visible light along at least part of its length and is held in a fastening device (2, 3). The optical wave guide (1) is positioned inside a strip of material (3) of the fastening device, which strip forms a transparent hollow part (2). In its cross section, the fastening device has a strip of material extending away from the hollow part (2) and serving as fastening lug (4) with which the optical wave guide (1) is held in the hollow part (2) and is attached to the interior decorating item. At least one end of the optical wave guide (1) has a light source for introducing light into the optical wave guide (1). The interior decorating item can also be an optical wave guide visibly held under a seam or sewn into the item.

7 Claims, 2 Drawing Sheets

INTERIOR DECORATING ITEM AND USE OF AN OPTICAL WAVE GUIDE AS DECORATIVE THREAD ON SUCH INTERIOR DECORATING ITEMS

This application is a continuation of application Ser. No. RT/EP98/03449, filed Jun. 9, 1998.

TECHNICAL FIELD

The invention relates to interior decorating items, for example, in a motor vehicle or an aircraft, in particular a seat for motor vehicles or aircraft, an instrument console, an inner cover for vehicle doors on which light effects are generated. In addition, the invention concerns the use of an optical wave guide which emits at least over one part of its length visible light as a decorative thread for the generation of light effects on such interior decorating items.

PRIOR ART

It is already known that the illumination of contours with optical wave guides should be carried out in the interior of motor vehicles. For example, in a seat switch, which is built into a series of motor vehicles produced by the firm Mercedes Benz AG, the illumination of the seat switch contour is carried out with the aid of an optical wave guide. This known illumination of contours is constructed so that the optical wave guide itself is not visible, but it is located behind the user panel, which is formed to be permeable by light on the contour which is to be illuminated. Thereby the optical wave guide is protected against contact and wear and tear by the user panel which is designed to be partly light-permeable.

As optical wave guides, mainly PMMA fibers (polymethyl-methacrylate) which are on the market are used.

These fibers possess, depending on the length of the contour which is to be illuminated, a diameter of 0.2 to 3.0 mm. The PMMA fibers are also used with an additional protective jacket in the automobile industry for the transmission of data. The advantage of such plastic fibers against glass fibers is to be found in the unproblematical processing and in their high elasticity in the case of the thicker fibers which are used here. The high elasticity is necessary so that smaller bending radii of the contours to be illuminated become possible.

The light input is carried out at both ends of the optical guide fibers with light diodes (LED). In order to obtain sufficient intensity given a length of about 0.5 m in the middle of the contour as well, a fiber diameter of about 1.5 mm is necessary. But still thicker fibers have too clumsy an effect for contour illumination.

In addition, for constant brightness along the contour, mechanical processing of the surface of the optical guide fiber is necessary. But this is a familiar process, which has already been mastered by various companies. In this context, depending on the bending radius which is desired in the zone of the optical guide fiber, its surface is treated differently. In principle it should be stated in this connection that the narrower the bending radius, the greater is the light dispersion which is present already per se in the optical guide fiber on the surface, so that there less treatment or even no surface treatment is necessary. But on the straight stretches of the optical guide fiber, the surface has to be specially treated, so that sufficient light is emitted to the exerior on this stretch.

To fasten such optical wave guides for this purpose, in the case of the seat switch contour illumination, clips are injection molded on to the panel. This means that the optical wave guide is pressed into the holder clip, so that it is located firmly there.

To achieve special technical design embodiments—general light effects on items—however, such a fastening is problematical on the surface of a part of the interior equipment, such as, for example of a motor vehicle and in particular an edge contour of such a part of the equipment. On the one hand, it is frequently not desirable for technical design reasons that the fastening clips should be visible. On the other hand, the optical wave guide in the known device is not protected against direct contact and it is subjected to the most varied environmental influences, such as, for example, moisture, aggressive cleaning solvents and the like. But such environmental influences, in particular, may strongly adversely affect the function of the optical wave guide when it is used in a motor vehicle.

In a totally different special field, and in fact in the production of hot air balloons, the problem of the guidance and fastening of an optical wave guide along longer stretches has already been discussed. In DE 93 18 356.9 U1 a device for the guidance and fastening of an optical wave guide is shown on the outer skin of a hot air balloon. In the device which is known therefrom, the optical wave guide is arranged in a fabric tube with a large cross-section. This fabric tube itself is sewn with a seam on to the external skin of the hot air balloon. The fabric tube is to provide protection against damage as well as against heat which exits from the balloon. For this purpose the fabric tube is designed to be freely current linkable on the outside. In addition, the internal cross-sectional surface of the fabric tube is far greater than that of the optical wave guide. Correspondingly the optical wave guide can move freely in the fabric tube, so that when the balloon is folded up, the optical wave guide can move freely in the fabric tube and cannot be damaged by bending.

From DE 43 15 645 A1, a display device is known comprising an optical wave guide. But the optical wave guide is only used to forward incident dispersed light (in this case atmospheric 35 light which is incident when the car boot is open) at one end of the optical wave guide onwards to the vehicle cockpit, where the optical wave guide serves, so to speak, as a "control lamp". Thereby the optical wave guide is used in the conventional manner, to conduct the light from one point to another.

In DE 18 05 911 U, an elastic clamp fitting is disclosed for the fastening of lines and cables. This clamp fitting is wound section by section around the line to be installed. In accordance with the main purpose of the clamp fitting, i.e. to fasten electrical lines in motor vehicles, the application is certainly carried out so that the lines and the clamp fittings which are arranged segment by segment are not visible from the exterior.

DESCRIPTION OF THE INVENTION

The technical problem on which the invention is based consists of making possible new technical light effects on an interior decorating item for emphasizing contours of whatever type.

This technical problem is solved by an interior decorating item, for example, in a motor vehicle or an aircraft wherein a fastening device for the interior decorating item is distinguished by the fact that it holds the optical wave guide in a strip of material of the fastening device which forms a light-permeable hollow portion and, when viewed in cross-section, it has a strip portion which extends away from the hollow portion and which is used as a fastening strip, by which the optical wave guide is held in the hollow portion is mounted on the interior decorating item.

This fastening device therefore makes it possible for the first time that at least over one part of the length of the optical guide, visible light which is emitted is capable of being perceived by a person seated in the motor vehicle or in the aircraft, and in fact on those segment of the optical wave guide on which the fastening has been secured. In addition, two advantages are achieved by such a fastening device. On the one hand, the hollow part of the material strip which surrounds the optical wave guide creates protection against direct contact with the optical wave guide, and on the other, at the same time the possibility of fastening by means of a securing strip is created. This securing strip can therefore be sewn, nipped or glued in the manner know per se.

Advantageously the optical wave guide is surrounded throughout in its longitudinal extension by the hollow part of the material strip which is formed, in order thereby to provide optimum guidance for the optical wave guide and optimal protection for the optical wave guide.

The fastening device per se can be formed in principle from a flexible material strip, such as advantageously a transparent film or a fabric or fiber braid. But on the other hand it is just as possible to design the material strip as an integral plastic injection molded part which is to some extent flexible, in which the hollow part and the securing strip are produced in an injection molding or an extrusion molding process.

In the case of the flexible material strip design, in the most simple form the optical wave guide can be inserted in the longitudinal direction of the strip. Then the material strip is folded around it and in an advantageous manner is fixed by welding or by adhesion in the longitudinal direction of the optical wave guide in the hollow part which is formed thereby.

In a favourable embodiment, a transparent adhesive film is used as the material strip. Thereby the material strip itself adheres to the optical wave guide, so that the material strip cannot be pushed into itself in relation to the optical wave guide, which would adversely affect the aesthetic appearance. On the other hand, it may also be expedient to provide a certain capacity for longitudinal displacement of the optical wave guide in the hollow part which is formed in the fastening device, in order thereby to facilitate the realisation of the contours with different curvatures and radii. This capacity for longitudinal displacement of the optical wave guide can, for example, be obtained by using the above-mentioned integral plastic injection molded parts or the above-mentioned material strips which are glued or welded in the longitudinal direction.

Such a fastening device can without problems be integrated without problems in the manner known per se, like an edge reinforcement piping—i.e. an edge reinforcing bulge, for example, on the cushions of vehicle seats—with the fastening strip and be sewn into a seam which is provided thereon.

On the basis of the outstanding properties for the present purpose, in particular, a PMMA fiber which has a diameter between 0.2 to 3.0 mm is advantageous as the optical wave guide.

With respect to the materials for an optical wave guide which can be used in the invention, attention is drawn in particular to DE 43 15 645 A1, which was named above. For example it is explained there that individual glass or plastic fibers can be considered with a core and a jacket as optical wave guides in principle. Expressis verbis recourse is had to the known materials, such as thin round fibers made of quartz glass with outer diameters of up to about 150 μm or also of plastic with diameters of about 1 mm. In addition, graduated profile optical wave guides, i.e. single mold or multi mold optical wave guides, are mentioned as gradient optical guides. In addition, it is stated that optical wave guides are relatively sensitive optically as well as mechanically, so that it is an advantage to use optical wave guides with a protective jacket.

The protective jacket, however, is achieved, as is well known, by a coating process of the optical wave guide. All the types of optical wave guides which are explained here are in principle suitable for use in accordance with the invention to achieve special light effects.

With respect to the input of light, we draw attention as an example to EP 0 515 921 A2. There internal lighting for motor vehicles is explained, which is inserted in a holder or door handle. In the intermediate piece of the handle, an optical wave guide is arranged which is located with its front surface facing a glow lamp, for example, in the combustion point of a reflector or of a lens, and which is provided with reflection means on the longitudinal side facing away from the exit direction of the light. These exemplary possibilities of hte source of light can also be used with the present invention.

However, in principle sewing over an optical wave guide is already sufficient for fastening it, in order to make possible new technical light effects on the surfaces of interior decorative items of any type. In this connection, naturally light is fed into at least one end of the optical wave guide by means of a light input device.

Without further fastening means, technical light effects corresponding to the kind named above already become possible in that a thin optical fiber is itself sewn in as a decorative thread in the interior decorative item, and at least at one end of the optical wave guide, light is input by means of a light input device.

In addition, of course the most varied color effects can be made possible with the fastening in accordance with the invention as well as with the use thereof and the processes which have been described for the generation of special light effects, in that colored plastic films or materials for a fastening device in accordance with the invention are used. However, thought can also be given to designing the optical guide itself to be colored.

BRIEF DESCRIPTION OF THE DRAWINGS

For further explanation and for a better understanding, a plurality of embodiments of the invention will be described and explained in more detail below with reference to the enclosed drawings. They show.

DESCRIPTION OF EXAMPLES OF THE EMBODIMENTS OF THE INVENTION

Figure 1:
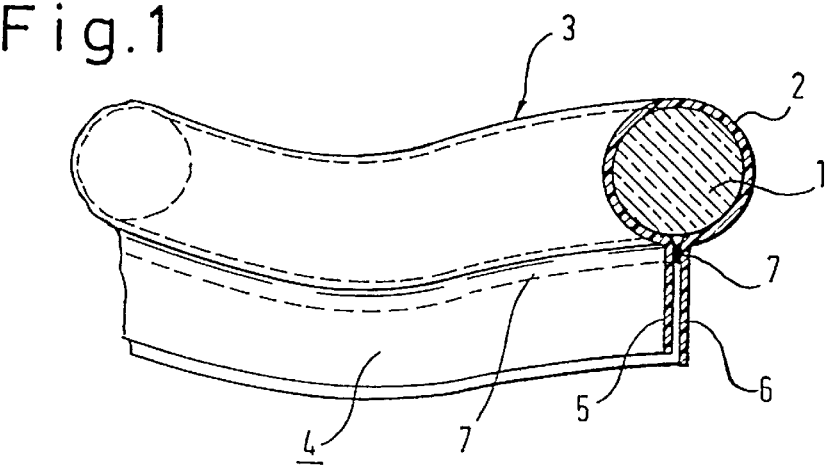
FIG. 1 a perspective view of a fastening device in accordance with the invention with an optical wave guide inserted in its hollow part, FIG. 2 a cross-sectional view through a support arrangement with cover parts on it, in the connecting seam of which a fastening device in accordance with the invention is integrated with an inserted optical wave guide, FIG. 3 a schematic perspective view, which shows a further possibility for fastening a fastening device in accordance with the invention for an optical wave guide by means of a clamping strip, FIG. 4 another embodiment of a possibility for fastening an optical wave guide in a recess of a support part, which is laminated with cover parts, and FIG. 5 a plan view of the schematic drawing of the fastening of an optical fiber in accordance with FIG. 4.
Figure 2:
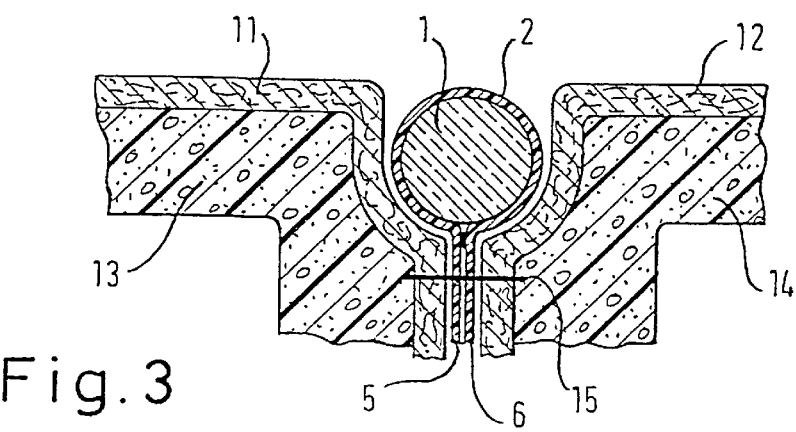
Figure 3:
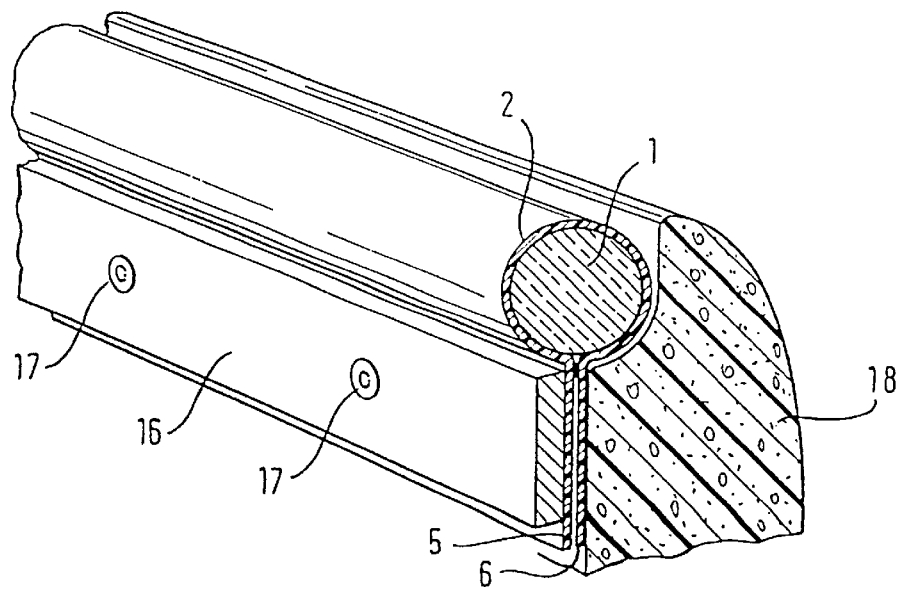

With reference to FIGS. 1 to 3, a first embodiment of a fastening device for an optical wave guide will be explained in more detail. As can very well be seen in FIG. 1, a longitudinal material strip 3 made of a plastic film is placed around an optical wave guide 1. In order to form a hollow part 2, in which the optical wave guide 1 is located, projecting parts 5, 6 are welded with each other on a connecting line 7. Thereby a fastening strip is created by the projecting parts 5, 6 of the film.

The optical wave guide 1 is clamped in the hollow part 2 of the plastic film, but it can still be displaced in the longitudinal direction of hollow part 2.

In FIG. 2, an examplary fastening of the fastening device in accordance with FIG. 1 is shown in cross-section. Two support parts 13, 14 which impact on each other and which, for example, are components of an instrument console are backed respectively by the cover parts 11, 12. In the more luxurious interior decorative items, the cover parts 11, 12 consist of leather.

The support parts 13, 14 with the respectively laminated cover parts 11, 12 have at their impact points an approximately semicircular groove, which is slightly larger than the diameter of an optical wave guide 1. The optical wave guide 1 which is inserted in a fastening device in accordance with FIG. 1 is integrated on the fastening lug 4 in the seam connection 15 of the cover parts 11, 12. This means that the optical wave guide 1 is integrated in a protected manner to the exterior in approximately the same plane in the surface of support parts 13, 14 with the cover parts 11, 12 laminated thereon. Even when, instead of the impacting support parts 13, 14, a continuous support part is present with a corresponding reception groove, the fastening strip can be integrated with the inserted optical wave guide in the seam connection 15 of cover parts 11, 12.

Another possibility for fastening an optical wave guide is shown in a fastening device in accordance with FIG. 1 in FIG. 3. There in examplary manner a door pocket exterior part 18 is recessed in approximately the form of a quadrant of a circle. The recess corresponds in its outer diameter of optical wave guide 1 approximately to the film which is wound around it. After the fastening device in accordance with FIG. 1 together with the optical wave guide 1 inserted in it has been placed in the quadrant shaped recess, a clamping strip 16 is positioned on the inside of the door pocket exterior part 18 so that the fastening strip which is formed by the projecting parts 5, 6 of the plastic film is clamped between the door pocket outer part 18 and the clamping strip 16. The positioning is then carried out by means of fastening pins 17. Thereby the secure fixture of the optical wave guide 1 on the door pocket external part 18 is achieved.

Figure 4:
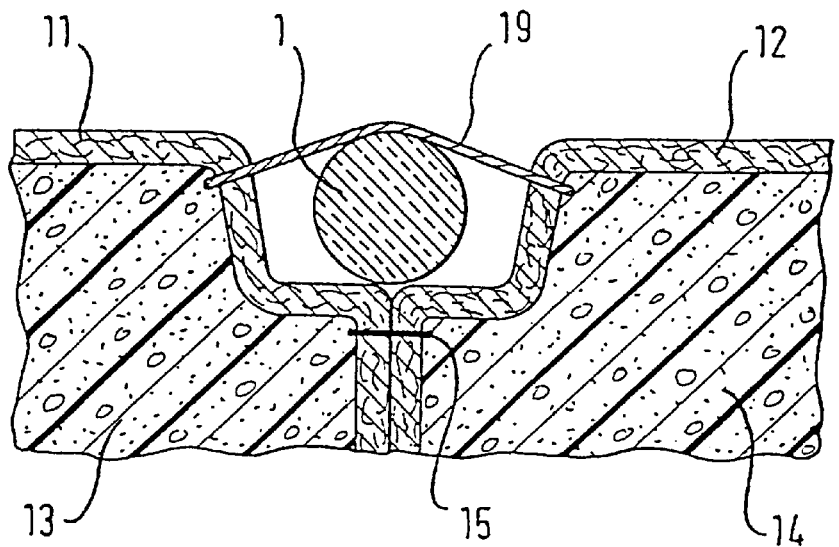
Figure 5:
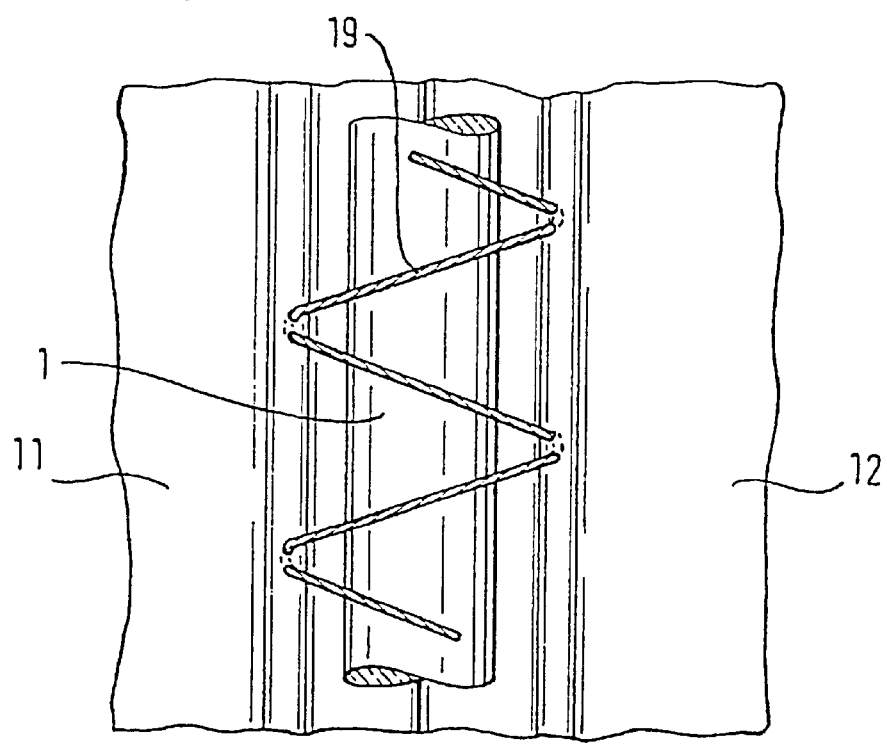

A basically different type of fastening for an optical wave guide 1 is shown in the schematic cross-sectional view in accordance with FIG. 4. Th basic structure of the support parts 13, 14 and of the cover parts 11, 12 laminated thereon corresponds to that of FIG. 2. In the type of fastening which is shown here for an optical wave guide 1, however, optical wave guide 1 is held firmly beneath a seam comprised of a thread 19 which extends in zig-zag form back and forth on one side of optical wave guide 1, for example, in the groove. The course of the thread 19 can be seen especially well in plan view from FIG. 5. Thereby the optical wave guide 1 is held integrated in its turn in one surface.

The common factor in all embodiments in accordance with FIGS. 1 to 5 is that at least at one end the coupling of light is carried out via a light diode (LED) or a laser diode. Given greater lengths of the optical wave guide 1, the input of light is carried out by light at both ends of optical wave guide 1. Thereby even luminosity is achieved over the entirety of the length of optical wave guide 1. The source and the means which are needed for it correspond to the prior art. Therefore comment will not be made expressis verbis in this connection.

An embodiment which is in fact not shown here but is still worthy of mention for the achievement of special light effects on a surface by means of an optical wave guide is provided in that the optical wave guide itself is guided moving backwards and forwards like a thread in the cover parts 11, 12, whereby it is fixed on the surface by its insertion as a thread in the cover parts 11, 12.

What is claimed is:

1. An interior decorating system comprising a flexible optical wave guide of substantial length for emitting light over at least a part of the length of the wave guide, a fastening device comprising an elongated strip of flexible light permeable material of substantial length extending lengthwise on the wave guide and surrounding the wave guide with opposite side edge portions of the strip secured to each other adjacent said wave guide and extending outwardly from the wave guide to define a fastening lug secured to a structural component for securing the wave guide to said structural component and a source of light adjacent at least one end of the wave guide for supplying light to the wave guide.

2. An interior decorating system as set forth in claim 1 wherein the opposite side edge portions of the strip are secured to each other by adhesion.

3. An interior decorating system as set forth in claim 1 wherein the flexible light permeable material is a transparent film.

4. An interior decorating system according to claim 1 wherein the flexible light permeable material is a fabric.

5. An interior decorating item according to claim 1 wherein the optical wave guide is comprised of a PMMA fiber (polymethyl methacrylate) having a diameter of between 0.2 and 3.0 mm.

6. An interior decorating system comprising at least one structural component having a cover thereon and a partial semicircular groove, a flexible optical wave guide disposed in said groove and secured therein by a holding seam comprised of at lest one thread secured to said cover on opposite sides of the wave guide and extending over the length of the wave guide and spaced to permit visible light from the wave guide emitting through spaces between the seam, and a source of light disposed adjacent at least one end of the optical wave guide for supplying light to the wave guide.

7. An interior decorating item according to claim 6 wherein the optical wave guide is comprised of a PMMA fiber (polymethyl methacrylate) having a diameter of between 0.2 and 3.0 mm.

* * * * *